United States Patent Office 3,427,356
Patented Feb. 11, 1969

3,427,356
PRODUCTION OF 1,3-PROPYLENEDIAMINES
Karl Baer, Weinheim, Bergstrasse, Herwig Hoffmann, Frankenthal, Pfalz, and Hermann Suessenguth, Ludwigshafen (Rhine), Germany, assignors to Badische Anilin & Soda-Fabrik Aktiengesellschaft, Ludwigshafen (Rhine), Germany,
No Drawing. Filed Mar. 14, 1967, Ser. No. 622,911
Claims priority, application, Germany, Mar. 22, 1966, B 86,311
U.S. Cl. 260—583       3 Claims
Int. Cl. C07c 85/12; B01j 11/22

ABSTRACT OF THE DISCLOSURE

A process for the production of 1,3-propylenediamines by hydrogenating β-aminopropionitriles in the presence of ammonia at temperatures below 200° C. and at superatmospheric pressure and using cobalt or nickel catalysts, wherein the hydrogenation is carried out in the presence of a small amount of a manganese compound dissolved in the hydrogenation mixture.

---

This invention relates to a new process for the production of 1,3-propylenediamines by hydrogenating β-aminopropionitriles.

It is known that 1,3-propylenediamines may be produced by hydrogenating β-aminopropionitriles using Raney cobalt or Raney nickel as catalyst. However in practice hydrogenation with Raney catalysts has many disadvantages. In particular there is a substantial decline in activity after short hydrogenation periods. Other catalysts prepared by reducing cobalt oxide or nickel oxide as such or cobalt oxide or nickel oxide precipitated on carriers and recommended in British Patent 824,535 for the hydrogenation of β-aminopropionitrile also have an unsatisfactory life. The catalysts readily decompose and are quickly deactivated especially by polymer deposits.

It is an object of the present invention to provide a process for the production of 1,3-propylenediamines by hydrogenating β-aminopropionitriles, wherein the activity of the catalyst remains constant for long periods of operation and there is no substantial decomposition of the catalyst or deposition of polymers on the catalyst.

These and other objects of the invention are achieved in a process for the production of 1,3-propylenediamines by hydrogenating β-aminopropionitriles in the presence of ammonia at temperatures below 200° C. at superatmospheric pressure using cobalt or nickel catalysts, wherein the hydrogenation is carried out in the presence of a small amount of a manganese compound dissolved in the hydrogenation mixture.

In the new process, surprisingly, only negligible amounts of polymer are deposited on the catalyst. The life of the catalysts is considerably extended.

β-Aminopropionitriles suitable as starting materials are β-aminopropionitrile, H₂N—CH₂—CH₂—CN, and compounds which are derived from β-aminopropionitrile by replacing the hydrogen atoms attached to the nitrogen atom and/or carbon atoms by organic radicals. α-Methyl-β-aminopropionitriles and β-aminopropionitriles which may be obtained by the addition of ammonia or primary or secondary amines to methacrylonitrile or preferably acrylonitrile and which may bear hydrogen, identical or different alkyl groups having one to four carbon atoms or β-cyanoethyl groups as substituents on the amino nitrogen atom are particularly suitable. Examples are β-aminopropionitrile, N-methyl-β-aminopropionitrile, N, N - dimethyl - β - aminopropionitrile, di-(2-cyanoethyl)-amine, tri-(cyanoethyl)-amino and α-methyl-β-aminopropionitrile.

β-Aminopropionitriles obtainable by the addition of amines to (meth)acrylonitrile are derived preferably from primary or secondary amines whose hydrocarbon radicals attached to the nitrogen atom have up to six carbon atoms each, for example alkyl, alkylene and cycloalkyl radicals. Examples of suitable amines are methylamine, diethylamine, cyclohexylamine and piperidine. However, ethanolamine, morpholine and other amines whose hydrocarbon radicals bear inert substitutents may also be used. Alkyl radicals attached to the nitrogen atom preferably have one to four carbon atoms or β-cyanoethyl groups.

The β-aminopropionitriles do not need to be used in pure form. On the contrary it is advantageous to use the crude reaction mixture formed by the addition of ammonia or amines to (meth)acrylonitrile. Excess amines which may be present in the mixture can be recovered unchanged after the hydrogenation.

The hydrogenation is carried out in conventional manner in the presence of ammonia, the purpose of which is to repress the formation of secondary amines during the hydrogenation of the nitrile group. It is advisable to use 0.1 to 100 times, preferably 5 to 20 times, the weight of ammonia with reference to the amount of β-aminopropionitrile used.

The process is carried out in the presence of cobalt or nickel catalysts conventionally used for the hydrogenation of the nitrile group, either unsupported or supported. Inert materials such as alumina, natural or synthetic silicates, bentonites, silica gel, titanium dioxide, zinc oxide, magnesium oxide, kaolin and pumice may be used as catalyst carriers. Supported catalysts generally contain 2 to 30% by weight of cobalt or nickel. The catalysts may also contain mixtures of cobalt and nickel, as well as, if desired, small amounts of copper, silver or chromium as activator, these activators generally being used in an amount between 0.1 to 20% by weight with reference to the cobalt or nickel. Catalyst carriers are preferred which have good mechanical strength and preferably a surface area of between 3 and 15 m.²/g., for example α-aluminum oxide, sintered silicates such as bentonites, and anatase and rutile.

The catalysts are prepared in conventional manner, advantageously by reducing the oxide of the metal or a compound of the metal, preferably the oxide, which has been applied to the carrier or coprecipitated with the carrier. The reduction of the catalysts is carried out advantageously before the reaction, for example between 300° and 500° C. at superatmospheric pressure, for example at up to 350 atm., in a stream of hydrogen.

The essential feature of the present invention is that the hydrogenation is carried out in the presence of a small amount of manganese in the form of a manganese compound dissolved in the hydrogenation mixture. The amount of manganese may vary within wide limits. In general, between $10^{-6}$ and 1%, preferably between $10^{-4}$ and $10^{-2}$ percent by weight of manganese is used with reference to the β-aminopropionitrile. The type of manganese compound is not critical. Manganese salts of both inorganic and organic acids as well as chelate complexes of manganese are suitable, e.g. manganese nitrate, sulfate, acetate, formate and stearate. In cases where the starting material is a compound containing manganese in a higher valency stage than 2, the compound will be reduced to the divalent stage under the hydrogenation conditions. An appreciable effect is obtained even with very small amounts. The optimum amount of manganese can be easily determined by experimentation. The manganese compounds can either be dissolved in the starting material before hydrogenation or they can be dissolved in the amine or (meth)acrylonitrile before it is reacted to β-aminopropionitrile. It is also possible to introduce the manganese compounds, dissolved in a little solvent, e.g. water, into the hydrogenation zone at the same time as the starting material.

Sparingly soluble manganese compounds, e.g. manganese oxides or hydroxides, may also be used and the starting mixture passed before hydrogenation over a layer of molded articles consisting of or containing a sparingly soluble manganese compound. Even with short residence times, e.g. of 2 seconds to 5 minutes, sufficient amounts of the manganese compounds are dissolved by the starting mixture to considerably extend the life of the catalyst. The molded articles, containing or consisting of manganese oxide for example, may also be mixed with the molded articles of hydrogenation catalyst with the result that a small amount of manganese dissolves in the reaction mixture during hydrogenation.

Finally, it is also possible to use a hydrogenation catalyst which contains manganese, preferably as manganese oxide, in addition to cobalt and/or nickel. Manganese oxide may also be used for example as the carrier. Such catalysts contain for example cobalt or nickel and manganese in the weight ratio of between 1:0.01 and 1:50, in particular 1:01 and 1:5, calculated as the metals.

In the case of unsupported catalysts, i.e. catalysts consisting solely of cobalt and/or nickel and manganese, it is advantageous to use more than 10%, preferably 20 to 100%, by weight of manganese with reference to the amount of cobalt or nickel.

Since, when catalysts containing manganese or manganese oxide molded articles are used, the manganese slowly dissolves during operation of the process, it is advantageous to analyse the reaction product after extended periods of operation in order to determine the manganese content and, if necessary, raise the manganese level of the reaction mixture by metering in dissolved manganese compounds or replacing the charge of manganese oxide molded articles.

Hydrogenation is carried out in the conventional way, i.e. at a temperature below 200° C., advantageously between 20° and 150° C., preferably between 50° and 125° C. The process is operated at superatmospheric pressure, in general between 50 and 1,000 atm., in particular between 200 and 300 atm.

Hydrogenation is usually carried out continuously in the liquid phase. The process can be carried out by the bottoms method as well as by the trickling method.

In order to ensure good control of the hydrogenation temperature the starting mixture may be diluted with 0.1 to 10 times the amount of reaction mixture which has already been hydrogenated or with pure hydrogenation product.

The product is worked up in conventional manner after decompression and separation of ammonia by fractional distillation.

The invention is illustrated by the following examples.

EXAMPLE 1

Pelleted $\eta$-$\gamma$-aluminum oxide having a surface area of 250 m.²/g. (measured by the BET method) is impregnated with cobalt nitrate and manganese nitrate so that, calculated as metals, there is 15 wt. percent of cobalt and 5 wt. percent of manganese on the aluminum oxide pellets. In order to convert the nitrates into oxides the impregnated pellets are heated for several hours at 450° to 500° C. The catalyst is then reduced with hydrogen at elevated temperature.

500 ml. of this catalyst is then placed in a high pressure tube. A mixture of 30 g. of acrylonitrile and 300 g. of ammonia which have been reacted together in a preliminary reactor at 85° C. with an average residence time of 25 minutes to form mainly β-aminopropionitrile and di-β-cyanoethylamine is hydrogenated per hour according to the trickling process at 100° C. under a hydrogen pressure of 280 atm. gauge.

After the ammonia has been removed there is a yield of 62 wt. percent of 1,3-propylenediamine, 8.2 wt. percent of unreacted aminopropionitrile, 21.7 wt. percent of dipropylenetriamine and 7.5 wt. percent of residue (high boiling fractions). Analysis of the residue shows a manganese content of 0.005 wt. percent.

This catalyst has a life of 52 days. In comparison, a catalyst which is free of manganese and contains 15 wt. percent of cobalt on the pelleted $\eta$-$\gamma$-aluminum oxide has a life of only 6 days. A catalyst containing 10 wt. percent of cobalt and 1 wt. percent of manganese on α-aluminum oxide (surface area 6 m.²/g.) has a life of 200 days, a catalyst containing 10 wt. percent of cobalt, 4 wt. percent of manganese and 1 wt. percent of silver on α-aluminum oxide a life of 190 days and a catalyst containing 5 wt. percent of cobalt and 0.25 wt. percent of manganese on α-aluminum oxide a life of 92 days.

EXAMPLE 2

The same procedure is followed as in Example 1 except that a catalyst is used which has been prepared as follows.

A mixture of the oxides of cobalt and manganese containing 70 wt. percent of cobalt and 30 wt. percent of manganese, calculated as the metals, which has been obtained by coprecipitation of the carbonates from the nitrates with soda and decomposing the carbonates at 550° C. is shaped into pellets and the cobalt is reduced at elevated temperature under hydrogen pressure.

The catalyst is treated as in Example 1 at temperatures of from 105 to 115° C. and a total pressure of 280 atm. gauge and the nitriles are hydrogenated.

After the ammonia has been removed the reaction product contains 67 wt. percent of 1,3-propylenediamine, 4.0 wt. percent of unreacted aminopropionitrile, 25.1 wt. percent of dipropylenetriamine and 4.9 wt. percent of high boiling fractions.

Uninterrupted on-stream periods of 191 days can be achieved by both the trickling and bottoms method, whereas, in comparison, an unsupported cobalt catalyst with an addition of manganese lasts for only 14 days.

EXAMPLE 3

200 liters of a catalyst containing 15 wt. percent of cobalt oxide, 5 wt. percent of manganese oxide and 80 wt. percent of silicon oxide is reduced in a stream of hydrogen and placed in a high pressure tube. At a temperature of from 110° to 120° C. and a hydrogen pressure of 250 atm. gauge the tube is charged with a mixture of 90 kg. of ammonia and 27 kg. of crude bis-cyanoethylamine per hour, the latter containing, as impurities, 5 kg. of aminopropionitrile and 2 kg. of an unknown reaction product of NH₃ and acrylonitrile.

After the ammonia has been removed the reaction product contains 71 wt. percent of dipropylene triamine, 18 wt. percent of 1,3-propylene diamine and 11 wt. percent of high boiling fractions.

After four weeks the catalyst is practically unchanged, whereas a similar catalyst containing no manganese and consisting of 15 wt. percent of cobalt oxide and 85 wt. percent of silicon oxide has decomposed after only two weeks and is coated with polymer.

EXAMPLE 4

500 ml. of a reduced supported catalyst containing 15 wt. percent of cobalt on pelleted $\eta$-$\gamma$-aluminum oxide is placed in a high pressure tube. At 110° C. and a hydrogen pressure of 280 atm. gauge a mixture of 30 kg. of acrylonitrile and 300 kg. of ammonia which have been reacted in a preliminary reactor at 85° C. and an average residence time of 25 minutes is fed into the tube per hour. At the same time a solution of 100 mg. of manganese acetate in 10 g. of 1,3-propylenediamine is added to the feed per hour.

The process can be operated for 87 days in this way before there is an appreciable reduction in the activity of the catalyst.

If, however, no manganese is added but operating conditions remain the same, the catalyst has a life of only 6 days.

EXAMPLE 5

The same procedure is followed as in Example 4 except that no manganese acetate is added. Instead of 500 ml. of the catalyst only 450 ml. is used, and in addition 50 ml. of pelleted manganese oxide.

Under these conditions the catalyst has a life of 53 days before its activity has fallen by 10% of the initial activity.

EXAMPLE 6

A catalyst is used which contains 10 wt. percent of cobalt and 2 wt. percent of manganese on α-aluminum oxide. A reactor having an effective volume of 2 m.³ is filled with catalyst and charged with 40 kg. of N,N-dimethylaminopropionitrile and 50 kg. of ammonia per hour at 115° to 120° C. Hydrogenation is carried out under a hydrogen pressure of 250 atm. gauge by the trickling method. N,N-dimethyl-1,3-propylenediamine is obtained in a yield of about 90% of the theory. The activity of the catalyst is unchanged after 30 days.

We claim:

1. A process for the production of 1,3-propylenediamines by hydrogenating β-aminopropionitriles in the presence of ammonia at temperatures below 200° C. at superatmospheric pressure using cobalt or nickel catalysts, wherein the improvement comprises carrying out the hydrogenation in the presence of a small amount of a manganese compound dissolved in the hydrogenation mixture.

2. A process as claimed in claim 1 wherein the hydrogenation mixture contains $10^{-6}$ to 1 wt. percent of manganese, with reference to the β-aminopropionitrile used, in the form of a manganese compound dissolved in the hydrogenation mixture.

3. A process for the production of 1,3-propylenediamines having the general formula

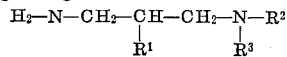

in which $R^1$ denotes hydrogen or methyl, and $R^2$ and $R^3$ denote hydrogen, an alkyl radical having one to 4 carbon atoms or the γ-aminopropyl group, by hydrogenating a β-aminopropionitrile having the general formula

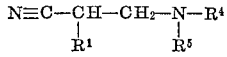

in which $R^1$ denotes hydrogen or methyl, and $R^4$ and $R^5$ denote hydrogen, an alkyl radical having one to four carbon atoms or the β-cyanoethyl group in the presence of ammonia at temperatures below 200° C. at superatmospheric pressure using cobalt or nickel catalysts, wherein the improvement comprises carrying out the hydrogenation in the presence of a small amount of a manganese compound dissolved in the hydrogenation mixture.

References Cited

UNITED STATES PATENTS 2,166,151  7/1939  Howk _____ 260—583

CHARLES B. PARKER, *Primary Examiner.*

R. L. RAYMOND, *Assistant Examiner.*

U.S. Cl. X.R.

260—690